UNITED STATES PATENT OFFICE.

WILLIAM DAWES, OF WASHINGTON COUNTY, TENNESSEE.

IMPROVEMENT IN SOAP.

Specification forming part of Letters Patent No. 24,011, dated May 17, 1859; antedated April 26, 1859.

*To all whom it may concern:*

Be it known that I, WILLIAM DAWES, of the county of Washington and State of Tennessee, have invented a new and Improved Article of Soap; and I do hereby declare that the following is a full and exact description of the ingredients used, as well as the method of making the same.

Take four (4) pounds of white bar-soap, three (3) pounds of brown bar-soap, one and a half (1½) pound of sal-soda, one-half (½) pint alcohol, one-half (½) pint table-salt, six (6) gallons boiling water.

To make this soap, let the water be boiling in a pot or kettle. Then cut or shave the soaps up very fine. Add to the soaps the soda, and put both in the kettle of boiling water and let them boil together from five to ten minutes, stirring well while boiling. After it has well dissolved, add the alcohol and salt, after taking it off the fire, and stir all well together. It may then be run off into molds, and when cold will be fit for use. This is for a washing-soap. The above proportions are for fifty-five (55) pounds. By a slight change being made in the above-named ingredients a toilet-soap may be made therefrom.

What I claim as my invention and improvement, and desire to secure by Letters Patent, is—

The use of the ingredients when combined in the proportions herein set forth, the whole forming an improved soap.

WILLIAM DAWES.

Witnesses:
REUBEN RODDIE,
D. T. WILDS.